(12) United States Patent
Lee

(10) Patent No.: US 9,803,409 B2
(45) Date of Patent: Oct. 31, 2017

(54) HINGE DEVICE FOR OPENING AND CLOSING COVER OF OFFICE EQUIPMENT

(71) Applicant: Nifco Korea, Inc., Asan-si (KR)

(72) Inventor: Dae Won Lee, Asan-si (KR)

(73) Assignee: NIFCO KOREA INC., Ansan (KR)

( * ) Notice: Subject to any disclaimer, the term of this patent is extended or adjusted under 35 U.S.C. 154(b) by 0 days.

(21) Appl. No.: 15/120,146

(22) PCT Filed: Feb. 23, 2015

(86) PCT No.: PCT/KR2015/001720
§ 371 (c)(1),
(2) Date: Sep. 27, 2016

(87) PCT Pub. No.: WO2015/126207
PCT Pub. Date: Aug. 27, 2015

(65) Prior Publication Data
US 2017/0058586 A1   Mar. 2, 2017

(30) Foreign Application Priority Data

Feb. 24, 2014 (KR) .......................... 10-2014-0021210

(51) Int. Cl.
*E05F 1/12* (2006.01)
*E05D 11/10* (2006.01)
(Continued)

(52) U.S. Cl.
CPC .............. *E05F 1/1261* (2013.01); *E05D 3/02* (2013.01); *E05D 11/1064* (2013.01);
(Continued)

(58) Field of Classification Search
CPC ...... E05F 1/1261; E05D 3/02; E05D 11/1064; H04N 1/00554; H04N 1/00557;
(Continued)

(56) References Cited

U.S. PATENT DOCUMENTS

| 4,424,606 A * | 1/1984 | Sorimachi ............. E05F 1/1261 16/223 |
| 6,684,456 B2 * | 2/2004 | Lee ..................... E05D 11/1064 16/286 |

(Continued)

*Primary Examiner* — William Miller
(74) *Attorney, Agent, or Firm* — Porter, Wright, Morris & Arthur, LLP

(57) ABSTRACT

The present invention relates to a hinge device for opening and closing a cover of office equipment, and more particularly to a hinge device disposed at a cover which is rotatably opened and closed and having a multi-layered cam and a slider, so that a free stop section and a slow down section are performed in closing the cover, thereby reducing a noise in closing the cover and improving a sensibility of product.

The hinge device for opening and closing a cover of office equipment of the present invention comprises:

- a housing (10) which is disposed at a main body (110) of an office equipment and having a pair of hinge holes (11) on the upper portion thereof;
- a rotational lever (20) which is fixedly disposed at a cover (120) and having hinge holes (21) at the rear thereof and being provided with a hinge connection part (22) inserted into the upper portion inside the housing (10) at the lower portion of the rear thereof;
- a hinge shaft (30) being inserted into the hinge holes (11) of the housing (10) and the hinge holes (21) of the rotational lever (20) and combined with them and supporting rotation of the rotational lever (20) and the cover (120);
- a compression coil spring (40) being disposed inside the housing (10); and
- a slider (50) being disposed on the upper portion inside the housing (10) and being elastically supported by the compression coil spring (40), and the upper end portion of which contacts with the lower end surface of the hinge connection part (22) of the rotational lever (20); wherein (Continued)

the hinge connection part (22) of the rotational lever (20) is located at the front of hinge holes (21), so that a multi-layered cam (23) is provided to the lower end surface of the hinge connection part (22) and a supporting surface (51) is formed on the upper end surface of the slider (50), the multi-layered cam (23) of the rotational lever (20) has a stop cam (23a) in the center and at both sides thereof, down cams (23b) which locate at the rear than the surface of the stop cam (23a) and are lower than the stop cam (23a), the supporting surface (51) of the slider (50) has an inclined plane that is getting higher toward the front, at the center of the front end, a stop surface (51a) which contacts with the stop cam (23a) of the rotational lever (20) and down surfaces (51b) which is protruded from both sides of the stop surface (51a) and contact with the down cams (23b) are provided.

4 Claims, 4 Drawing Sheets

(51) Int. Cl.
*E05D 3/02* (2006.01)
*H04N 1/00* (2006.01)

(52) U.S. Cl.
CPC ..... *H04N 1/00554* (2013.01); *H04N 1/00557* (2013.01); *H04N 1/00559* (2013.01); *E05Y 2201/638* (2013.01); *E05Y 2900/608* (2013.01); *H04N 2201/0094* (2013.01)

(58) Field of Classification Search
CPC ........ H04N 1/00559; H04N 2201/0094; E05Y 2201/638; E05Y 2900/608; Y10T 16/538; Y10T 16/5383; Y10T 16/53834; Y10T 16/522; Y10T 16/593; Y10T 16/56; Y10T 16/61; Y10T 16/652
USPC ......... 16/286, 289, 223, 277, 71, 72, 82, 85; 399/380
See application file for complete search history.

(56) References Cited

U.S. PATENT DOCUMENTS

| | | | |
|---|---|---|---|
| 7,406,747 B2* | 8/2008 | Chol ................. | H04N 1/00519 16/239 |
| 7,665,183 B2* | 2/2010 | Choi ................. | H04N 1/00519 16/239 |
| 7,949,292 B2* | 5/2011 | Choi ................. | H04N 1/00519 16/277 |
| 8,464,393 B2* | 6/2013 | Kao .................. | E05D 11/105 16/277 |
| 8,850,660 B2* | 10/2014 | Kim .................. | E05F 1/1058 16/286 |
| 8,948,678 B2* | 2/2015 | Shin .................. | G03G 15/605 16/242 |
| 9,538,031 B2* | 1/2017 | Lee ................... | E05F 1/1261 |
| 2004/0045129 A1* | 3/2004 | Tamehira ........... | E05D 11/1064 16/223 |
| 2004/0117948 A1* | 6/2004 | Ohara ................ | B41J 29/13 16/286 |
| 2007/0199178 A1* | 8/2007 | Katsumata .......... | E05F 1/1261 16/286 |

* cited by examiner

[Fig. 1]
PRIOR ART
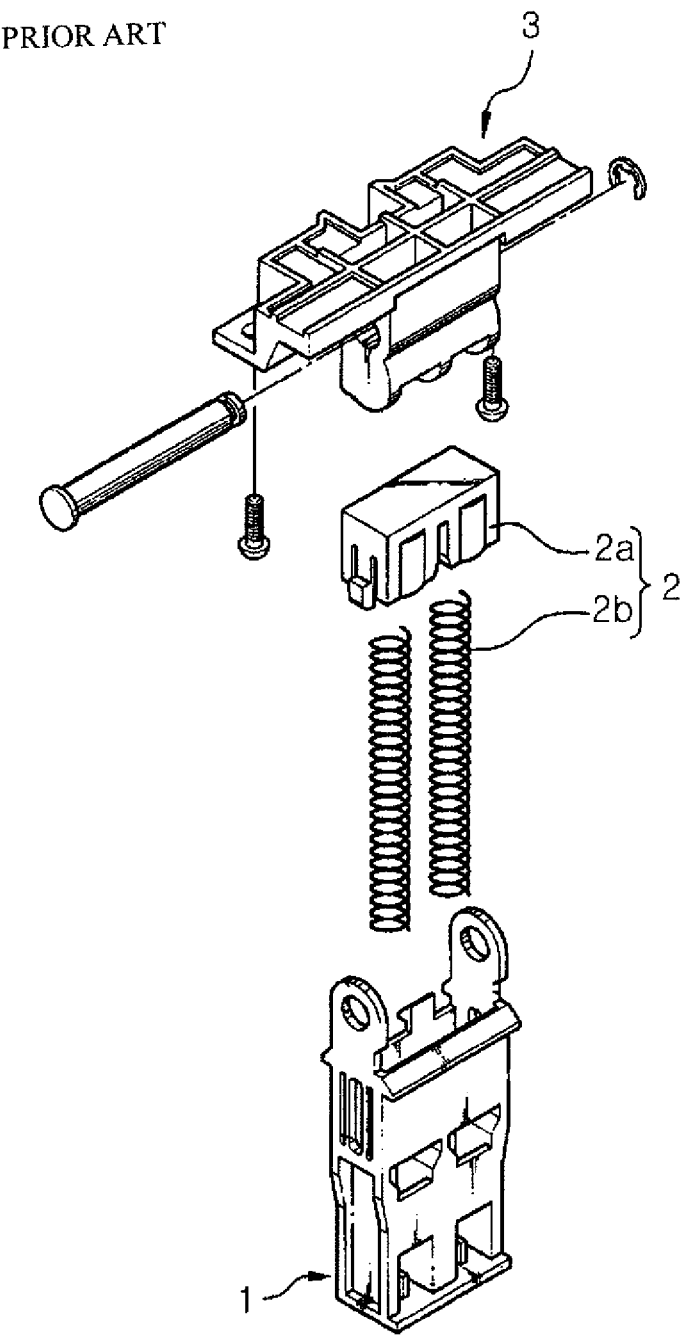

[Fig. 2]
PRIOR ART
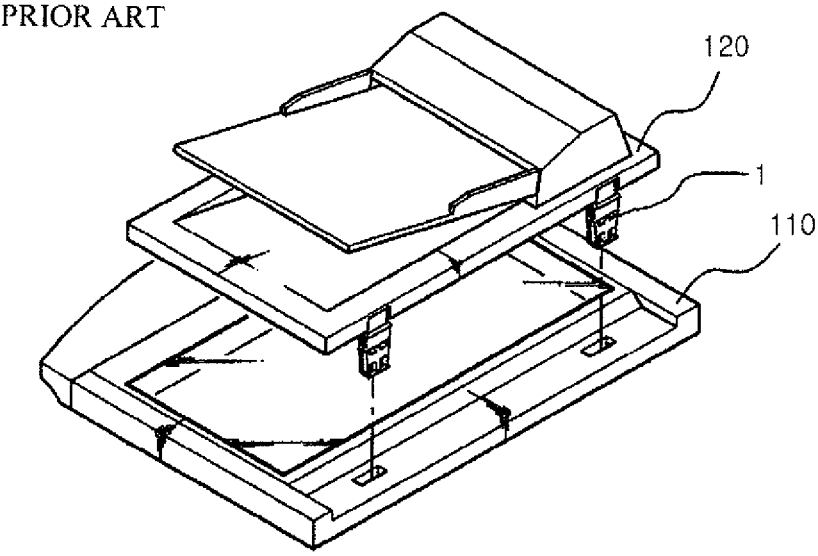
[Fig. 3]
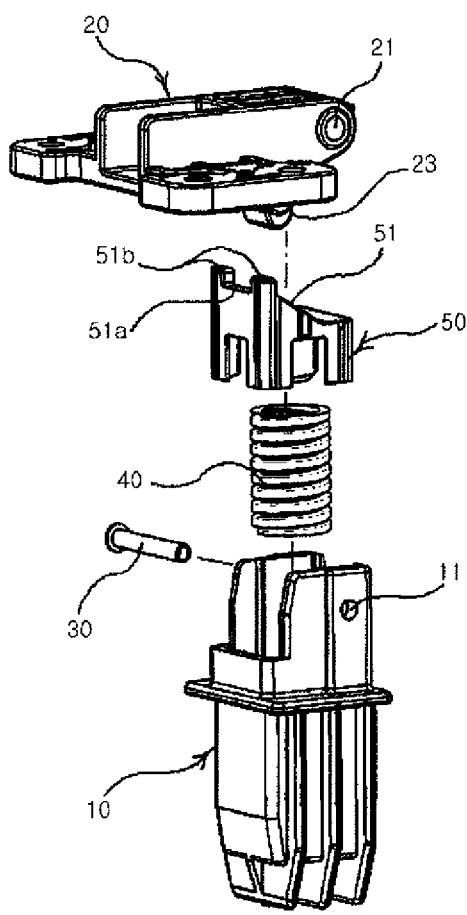

[Fig. 4]
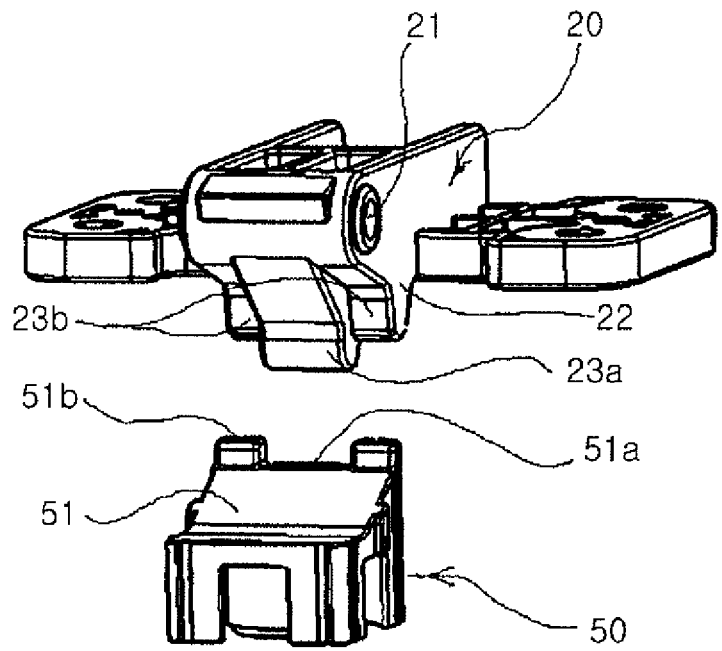
[Fig. 5]
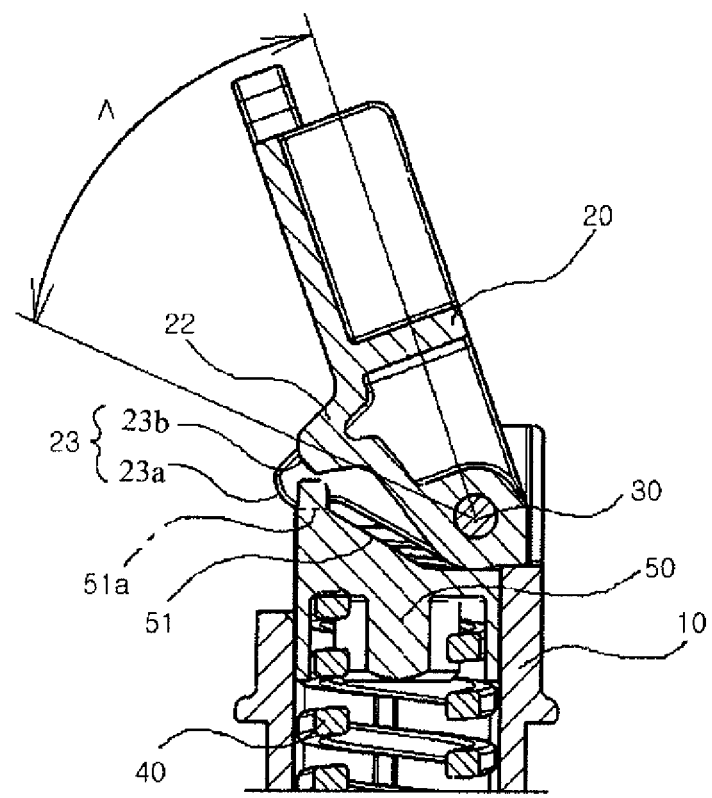

[Fig. 6]
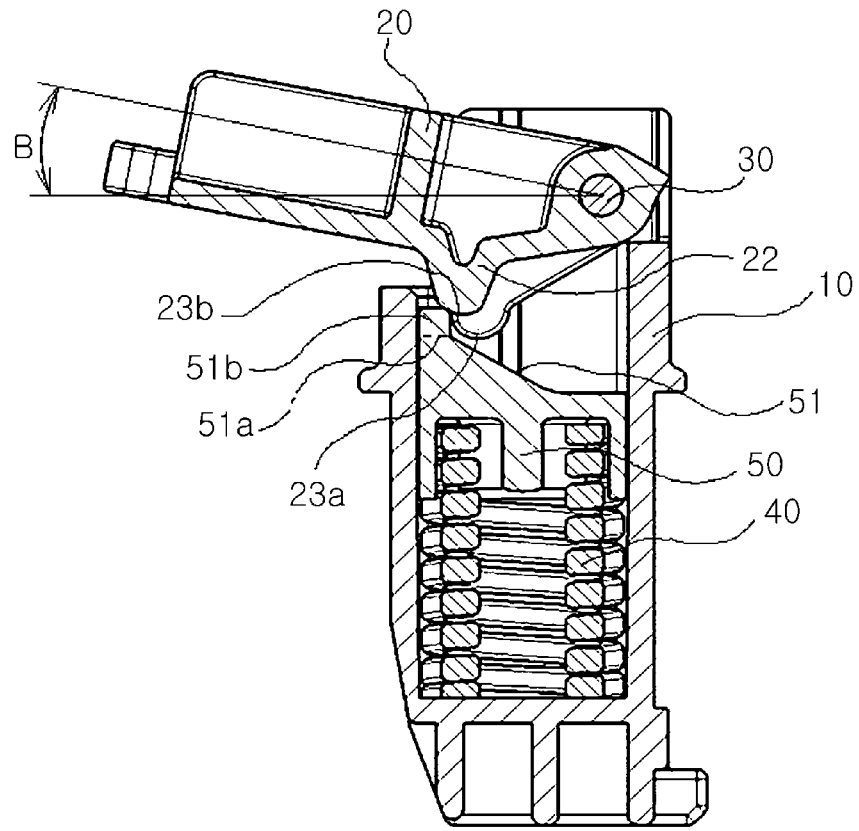
[Fig. 7]
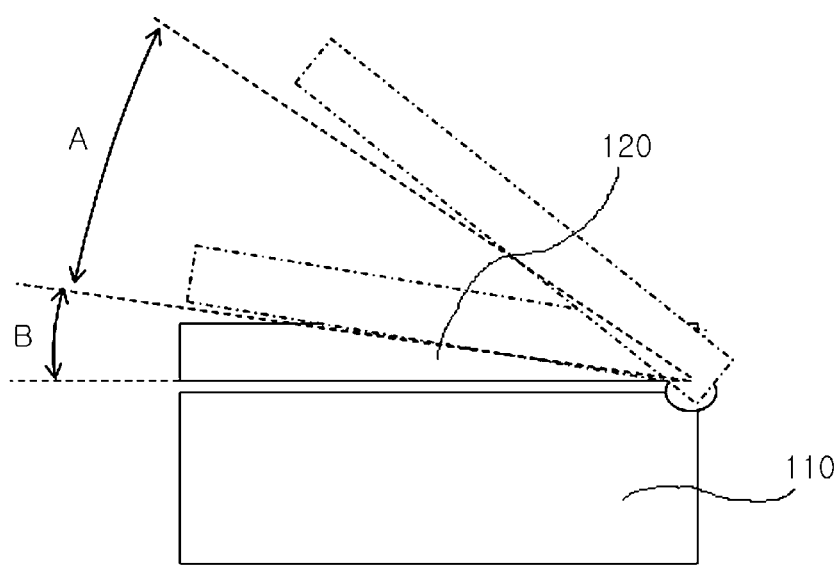

HINGE DEVICE FOR OPENING AND CLOSING COVER OF OFFICE EQUIPMENT

TECHNICAL FIELD

The present invention relates to a hinge device for opening and closing a cover of office equipment, and more particularly to a hinge device disposed at a cover which is rotatably opened and closed and having a multi-layered cam and a slider, so that a free stop section and a slow down section are performed in closing the cover, thereby reducing a noise in closing the cover and improving a sensibility of product.

BACKGROUND ART

In general, an office equipment such as a photocopier, a scanner, or a multifunction machine scans a document, then stores a scanned image as a data or prints the image on a printing paper. Such an office equipment includes a document glass disposed on a main body of the office equipment to scan the document, a cover to secure the document laid on the document glass, and a hinge apparatus connecting the cover and the main body of the office equipment.

FIG. 1 and FIG. 2 show a conventional hinge device including a hinge body (1), a pressure device (2) and a hinge cam (3), disclosed in Korean Patent No. 10-0474425.

The above hinge body (1) is disposed to a main body (110) of the office equipment to be moved upward and downward, at an upper part a cover (120) and a secured hinge cam (3) are coupled each other by means of a hinge shaft.

Further, a pressure device (2) having a spring (2b) and a pusher (2a) is disposed within the hinge body (1), and the pusher (2a) is movably upward and downward inside of the hinge body (1) and a front end protruded to the outside is supported in a contact state with the hinge cam (3).

Therefore, the cover (120) of the conventional office equipment is closed in a state that a cam part of the hinge cam (3) presses the pusher (2a) of the pressure device (2) in the inner direction, in opening the cover (120), the hinge cam (3) and the pusher (2a) are in contact under a minimum pressure.

Moreover, in case that a thick document is laid upon the document glass of the office equipment and the cover (120) is closed, the hinge body (1) is moved from the main body (110) of the office equipment to the upper part thereof, then a gap between the document glass and the cover (120) is increased.

However, the above device has a configuration that the cover is closed in tight contact of the hinge cam and the pusher by pressing the pusher using the one cam part disposed at the hinge cam, and therefore, a slow down section in which all the process is slowly performed is provided only.

In other words, a damping function which makes the cover closed slowly is performed, whereby it is impossible for the cover to maintain an opened state to a desirable section (angle).

Further, although a hinge device being performed a free stop function so as to configure freely an opening and closing angle of the cover within a certain range has been developed and used, in this case, a free stop section is small, thereby generating a loud noise in closing the cover or causing user's injury.

PRIOR ART DOCUMENT (Patent Document 1): Korean Patent No. 10-0474425, Hinge Apparatus for Cover of Office Machine (Patented on Mar. 10, 2005)

SUMMARY OF THE INVENTION

Technical Problem

The present invention is derived to resolve the problems of the prior art as discussed above and has an object to provide a hinge device for opening and closing a cover of office equipment so as to improve a sensibility of product as well as reduce a noise in closing the cover and prevent injury, by enlarging a free stop section.

Another object of the present invention is to provide a hinge device for opening and closing a cover of office equipment so as to reduce the number of required parts and a cost price, by configuring a multi-layered cam of one hinge cam and thereby performing a free stop function and a slow down function.

The Task Solution Means

In order to achieve the above and any other objects of the present invention, according to one aspect of the present invention there is provided a hinge device that comprises: a housing (10) which is disposed at a main body (110) of an office equipment and having a pair of hinge holes (11) on the upper portion thereof;

a rotational lever (20) which is fixedly disposed at a cover (120) and having hinge holes (21) at the rear thereof and being provided with a hinge connection part (22) inserted into the upper portion inside the housing (10) at the lower portion of the rear thereof;

a hinge shaft (30) being inserted into the hinge holes (11) of the housing (10) and the hinge holes (21) of the rotational lever (20) and combined with them and supporting rotation of the rotational lever (20) and the cover (120);

a compression coil spring (40) being disposed inside the housing (10);

a slider (50) being disposed on the upper portion inside the housing (10) and being elastically supported by the compression coil spring (40), and the upper end portion of which contacts with the lower end surface of the hinge connection part (22) of the rotational lever (20); wherein the hinge connection part (22) of the rotational lever (20) is located at the front of hinge holes (21), so that a multi-layered cam (23) is provided to the lower end surface of the hinge connection part (22) and a supporting surface (51) is formed on the upper end surface of the slider (50), the multi-layered cam (23) of the rotational lever (20) has a stop cam (23a) in the center and at both sides thereof, down cams (23b) which locate at the rear than the surface of the stop cam (23a) and are lower than the stop cam (23a), the supporting surface (51) of the slider (50) has an inclined plane that is getting higher toward the front, at the center of the front end, a stop surface (51a) which contacts with the stop cam (23a) of the rotational lever (20) and down surfaces (51b) which is protruded from both sides of the stop surface (51a) and contact with the down cams (23b) are provided.

Further, the stop cam (23a) which is a component of the multi-layered cam (23) of the rotational lever (20) is supported in contact with the stop surface (51a) of the supporting surface (51) and the down cams (23b) are supported in contact with the down surfaces (51b), so that the cover (120) fixedly connected to the rotational lever (20) is supported in an opened state.

Therefore, the stop cam (23a) which is the component of the multi-layered cam (23) of the rotational lever (20) is supported in contact with the stop surface (51a) of the supporting surface (51) so that the cover (120) fixedly connected to the rotational lever (20) is supported in an opened state. If the cover (120) is pressed to be in a closed state, a free stop section (A) where the stop cam (23a) presses the stop surface (51a) and moves the slider (50) toward the lower portion is arranged.

Moreover, when the stop cam (23a) which is the component of the multi-layered cam (23) of the rotational lever (20) passes through the stop surface (51a) of the supporting surface (51), a slow down section (B) where the down cams (23b) positioned at both sides of the stop cam (23a) press the down surfaces (51b) positioned at both sides of the supporting surface (51) and further move the slider (50) toward the lower portion is arranged.

Effect of Invention

According to the present invention structured as above, the rotational lever includes the multi-layered cam performing the free stop section and the slow down section, thereby reducing the number of required parts and a cost price.

In addition, the free stop section is extended in opening and closing the cover, thereby improving a sensibility of product as well as reducing a noise in closing the cover or preventing user's injury.

BRIEF DESCRIPTION OF DRAWINGS

FIG. 1 shows an exploded perspective view of a conventional hinge device.

FIG. 2 shows a perspective view of a conventional hinge device, which is in used state.

FIG. 3 shows an exploded perspective view of a hinge device according to the present invention.

FIG. 4 shows a rear perspective view of a rotational lever and a slider according to the present invention.

FIG. 5 shows a cross sectional view of a free stop section according to the present invention.

FIG. 6 shows a cross sectional view of a slow down section according to the present invention.

FIG. 7 shows a schematic side view of the office equipment to which the present invention is applied.

BEST MODE FOR CARRYING OUT INVENTION

Hereinafter, preferred embodiments of the present invention will be described in detail with reference to the accompanying drawings.

A hinge device for opening and closing a cover of office equipment according to the present invention is to provide with a hinge device disposed at a cover which is rotatably opened and closed and having a multi-layered cam and a slider, so that a free stop section and a slow down section are performed in closing the cover, thereby reducing a noise in closing the cover and improving a sensibility of product.

First of all, explaining the approximate reference of direction used in the present description with reference to FIG. 3 to FIG. 7, a hinge device has a structure that comprises: a housing (10) which is disposed at a main body (110) of an office equipment with a document glass and a hinge connection part (22) to connect a cover (120) pressing the document disposed on the document glass to the main body (110) of the office equipment, disposed at the bottom of the cover, thereby interconnecting the housing (10) and the hinge connection part (22), using a hinge shaft (30).

The housing (10) is fitted to one side of a mounting groove formed on the main body (110) of the office equipment to be moved upwardly and downwardly, and inside the body thereof, a receiving part is provided for receiving a compression coil spring (40) and a slider (50), and on the upper portion thereof, a pair of hinge holes (11) are positioned.

Further, a rotational lever (20) is fixedly disposed at the bottom of the cover (120), and at the rear thereof, hinge holes (21) are positioned, and at the lower portion of the rear thereof, the hinge connection part (22) located on the upper portion of the receiving part of the housing (10) is provided.

In addition, the slider (50) being received in the receiving part of the housing (10) is elastically supported by the compression coil spring (40), and the upper end portion thereof is contacted with the lower end surface of the hinge connection part (22) of the rotational lever (20).

Then, the hinge shaft (30) is inserted into the hinge holes (11) of the housing (10) and the hinge holes (21) of the rotational lever (20) and combined with them and interconnects the rotational lever (20) and the cover (120), thereby supporting rotation of the cover (120).

In addition, the hinge connection part (22) of the rotational lever (20) is located at the front of hinge holes (21), so that a multi-layered cam (23) is provided to the lower end surface of the hinge connection part (22) and a supporting surface (51) is formed on the upper end surface of the slider (50).

Further, the multi-layered cam (23) of the rotational lever (20) has a stop cam (23a) in the center and at both sides thereof, down cams (23b) which locate at the rear than the surface of the stop cam (23a) and are lower than the stop cam (23a).

In addition, the supporting surface (51) of the slider (50) has an inclined plane that is getting higher toward the front, at the center of the front end, a stop surface (51a) which contacts with the stop cam (23a) of the rotational lever (20) and down surfaces (51b) which are protruded from both sides of the stop surface (51a) and contact with the down cams (23b) are provided.

Further, it is advisable to have a large turning radius by locating the hinge connection part (22) of the rotational lever (20) at the front of the hinge holes (21) and prevent the rotational lever (20) from rotating excessively by forming a projection (not shown) which is projected to the upper portion of the housing (10) at the rear of the hinge holes (21).

Therefore, the stop cam (23a) which is the component of the multi-layered cam (23) of the rotational lever (20) is supported in contact with the stop surface (51a) of the supporting surface (51) and the down cams (23b) are supported in contact with the down surfaces (51b), so that the cover (120) fixedly connected to the rotational lever (20) is supported in an opened state.

As described hereinabove, the hinge device according to the present invention, as shown in FIG. 5, if the cover (120) connected to the rotational lever (20) is rotated in a certain angle in a closed state, from a maximum opening angle to a certain closing angle, a free stop section (A) is arranged where user can stop the rotational lever (20) and the cover (120) in any angle.

That is, the stop cam (23a) which is the component of the multi-layered cam (23) of the rotational lever (20) is supported in contact with the stop surface (51a) of the supporting surface (51) so that the cover (120) fixedly connected to the rotational lever (20) is supported in an opened state. At this time, if the cover (120) is pressed to be in a closed state, the free stop section (A) where the stop cam (23a) presses the stop surface (51a) and moves the slider (50) toward the lower portion is arranged.

Then, as shown in FIG. 6, after the free stop section (A) is arranged, a slow down section (B) where the cover (120) rotates by self load is arranged.

In other words, if the stop cam (23a) which is the component of the multi-layered cam (23) of the rotational lever (20) passes through the stop surface (51a) of the supporting surface (51), the slow down section (B) where the down cams (23b) positioned at both sides of the stop cam (23a) press the down surfaces (51b) positioned at both sides of the supporting surface (51) and further move the slider (50) toward the lower portion is arranged.

Explaining an embodiment of the present invention, if the slider (50) is pushed toward the multi-layered cam (23), the slider (50) is lifted upward and downward along the receiving part of the housing (10), thereby transmitting an elastic force of the compression coil spring (40) inside the lower portion thereof to the rotational lever (20).

A repulsive force of the compression coil spring (40) disposed inside the housing (10) is generated at the contact point of the supporting surface (51) in contact with the multi-layered cam (23) and a direction of force is acted in a vertical direction from the contact point, so that as shown in FIG. 5, in case that the free stop section (A) where the maximum height area of the stop cam (23a) does not contact with the stop surface (51a), the supporting surface (51) of the slider (50) can support the certain opening angle by supporting the rear where the hinge holes (21) of the hinge connection part (22) are positioned under a compression force of the compression coil spring (40).

Herein, although the maximum height area of the stop cam (23a) and the down cams (23b) which are the component of the multi-layered cam (23) are moved in contact with the stop surface (51a) disposed at the front of the supporting surface (51) and the down surfaces (51b) which are upwardly protruded from both sides of the stop surface (51a), the maximum height area of the stop cam (23a) is located at the rear than the maximum height area of the down cams (23b), so that the down cams (23b) and the down surfaces (51b) are located at the free stop section (A) with a certain space, as shown in FIG. 5.

In addition, when the stop cam (23a) is moved in contact with the stop surface (51a), the maximum height area of the down cams (23b) contact with the down surfaces (51b) before the maximum height area of the stop cam (23a) is contacted with the maximum height area of the stop surface (51a).

Therefore, in the free stop section (A), after user rotates the cover (120) and the rotational lever (20) counterclockwise (closing direction) and the maximum height area of the stop cam (23a) of the hinge connection part (22) is left from the stop surface (51a) of the slider (50), as shown in FIG. 6, the maximum height area of the down cams (23b) are moved in contact along the down surfaces (51b) and then the free stop section (A) is switched to the slow down section (B), even if user removes the pressure the cover (120) and the rotational lever (20) are rotated counterclockwise, so that the cover (120) is slowly closed.

Moreover, in the state that the cover (120) is closed, the multi-layered cam (23) of the hinge connection part (22) is located at the rear of the supporting surface (51) of the slider (50) and the slider (50) is lifted by the elastic force of the compression coil spring (40), and then the maximum height area of the down surfaces (51b) are supported in contact at the front of the maximum height area of the down cams (23b), so that the cover (120) is tightly contacted with the main body (110) of the office equipment.

The embodiments described above are to be understood as a few illustrative examples of the present invention and the invention is not limited to the embodiments and drawings. It will be understood by those skilled in the art that various modifications, combinations and changes may be made to the embodiments without departing from the scope of the present invention.

What is claimed is:

1. A hinge device for opening and closing a cover of office equipment having a main body (110), comprising:
    a housing (10) disposed at the main body (110) and having a pair of hinge holes (11) on an upper portion thereof;
    a rotational lever (20) fixedly disposed at the cover (120) and having hinge holes (21) at a rear thereof and a hinge connection part (22) inserted into the upper portion inside the housing (10) at a lower portion of the rear thereof;
    a hinge shaft (30) inserted into the hinge holes (11) of the housing (10) and the hinge holes (21) of the rotational lever (20) thereby supporting rotation of the rotational lever (20) and the cover (120);
    a compression coil spring (40) disposed inside the housing (10); and
    a slider (50) disposed on the upper portion inside the housing (10) and elastically supported by the compression coil spring (40), and having an upper end portion contacts with a lower end surface of the hinge connection part (22) of the rotational lever (20);
    wherein the hinge connection part (22) of the rotational lever (20) is located in front of the hinge holes (21), a multi-layered cam (23) is provided at the lower end surface of the hinge connection part (22), and a supporting surface (51) is formed on the upper end portion of the slider (50);
    wherein the multi-layered cam (23) of the rotational lever (20) has a stop cam (23a) in a center of the multi-layered cam (23) and down cams (23b) at both sides of the stop cam (23a), the down cams (23b) each have a maximum height area rear of a maximum height area of the stop cam (23a), and the maximum height areas of the down cams (23b) are lower than the maximum height area of the stop cam (23a);
    wherein the supporting surface (51) of the slider (50) has an inclined plane sloping upward toward a front end thereof, a stop surface (51a) at a center of the front end which contacts the stop cam (23a) of the rotational lever (20), and down surfaces (51b) which protrude from both sides of the stop surface (51a) and which contact the down cams (23b).

2. The hinge device for opening and closing the cover of office equipment according to claim 1, wherein the stop cam (23a) of the multi-layered cam (23) is supported in contact with the stop surface (51a) of the supporting surface (51) and the down cams (23b) are supported in contact with the down surfaces (51b) of the support surface (51), so that the cover (120) fixedly connected to the rotational lever (20) is supported in an opened state.

3. The hinge device for opening and closing the cover of office equipment according to claim 2, wherein if the cover (120) is pressed to be in a closed state, a free stop section (A)

is arranged where the stop cam (23*a*) presses the stop surface (51*a*) and moves the slider (50) toward the lower portion.

4. The hinge device for opening and closing the cover of office equipment according to claim 3, wherein when the stop cam (23*a*) of the multi-layered cam (23) passes through the stop surface (51*a*) of the supporting surface (51), a slow down section (B) is arranged where the down cams (23*b*) positioned at both sides of the stop cam (23*a*) press the down surfaces (51*b*) positioned at both sides of the supporting surface (51) and further move the slider (50) toward the lower portion.

\* \* \* \* \*